United States Patent [19]

Hini

[11] 3,713,069

[45] Jan. 23, 1973

[54] CONTACT-FREE ELECTRICAL PULSE GENERATOR UTILIZING GALVANOMAGNETIC SEMICONDUCTOR BODY

[75] Inventor: Paul Hini, Erlangen, Germany

[73] Assignee: Siemens Aktiengesellschaft, Berlin and Munich, Germany

[22] Filed: Sept. 22, 1969

[21] Appl. No.: 859,890

[30] Foreign Application Priority Data

Sept. 27, 1968 Germany .....................P 17 62 942.4

[52] U.S. Cl. .........................338/32, 323/94 H, 335/2

[51] Int. Cl. ...............................................H01c 7/16

[58] Field of Search .....307/309; 310/10; 317/235 H; 323/94 H; 335/215, 219, 2; 338/32, 32 H; 340/174 HA

[56] References Cited

UNITED STATES PATENTS 3,530,317 9/1970 Lang .....................................338/32

FOREIGN PATENTS OR APPLICATIONS 1,112,835 5/1968 Great Britain........................307/309

*Primary Examiner*—Benjamin A. Borchelt
*Assistant Examiner*—R. Kinberg
*Attorney*—Curt M. Avery, Arthur E. Wilfond, Herbert L. Lerner and Daniel J. Tick

[57] ABSTRACT

A permanent magnetic circuit directs a control magnetic field during operation to a galvanomagnetic semiconductor body. A first magnet in the circuit has a rectangular hysteresis loop. An outside magnet outside the magnetic circuit provides a magnetic field for abruptly switching the first magnet from one remanent state to the other whereby the total magnetic induction which results at the semiconductor body changes abruptly from one magnitude to another. A second magnet is connected in the magnetic circuit in magnetic parallel with the first magnet relative to the semiconductor body.

17 Claims, 21 Drawing Figures

B [Gs]

CONTACT-FREE ELECTRICAL PULSE GENERATOR UTILIZING GALVANOMAGNETIC SEMICONDUCTOR BODY

DESCRIPTION OF THE INVENTION

The invention relates to a contact-free electrical pulse generator. More particularly, my invention relates to a contact-free electrical pulse generator utilizing a galvanomagnetic semiconductor body.

An object of my invention is to provide a contact-free electrical pulse generator or switch, particularly suitable for control purposes, which comprises a permanent magnetic circuit and at least one galvanomagnetic semiconductor in said magnetic circuit, wherein the magnetic induction may be abruptly varied via an outside magnetic field. The pulse generator of the invention is especially suitable for controlling transistors, thyristors, relays, keyers, proximity switches, discharge switches, pulse generators, and the like.

British Pat. No. 1,112,835 discloses a contact-free electrical switch having a permanent magnet with a galvanomagnetic resistance therein. During operation, a control magnetic field acts upon the resistance. A magnet is utilized having a remanence which is substantially unchanged by the outside magnetic field. The outside magnetic field is simply added to the magnetic field of the permanent magnet which is in a magnetic circuit. It is assumed that the resistance is premagnetized or biased by the permanent magnetic field. This type of premagnetizing field is utilized to operate galvanomagnetic resistances in the linear branch of the characteristic, when the small field resistances have a nonlinear characteristic. The magnitude and steepness or switching velocity of the signals which may be provided with the switch of the British patent, depends primarily on the outside magnetic field. Steep signals may only be provided in the switch of the British patent with an appropriately rapid variation or change of the outside magnetic field.

The principal object of the invention is to provide a new and improved contact-free electrical pulse generator utilizing a galvanomagnetic semiconductor body.

An object of the invention is to provide a contact-free electrical pulse generator which provides rapid and abrupt switching from one signal magnitude to another.

An object of the invention is to provide a contact-free electrical pulse generator which is of simple structure and which functions with efficiency, effectiveness and reliability.

In accordance with the invention, a contact-free electrical pulse generator comprises a permanent magnetic circuit. A galvanomagnetic semiconductor body is in the magnetic circuit. The magnetic circuit directs a control magnetic field during operation to the semiconductor body. A first magnet in the magnetic circuit has a rectangular hysteresis loop. An outside magnet outside the magnetic circuit provides a magnetic field for abruptly switching the first magnet from one remanent state to the other whereby the total magnetic induction which results at the semiconductor body changes abruptly from one magnitude to another.

The first magnet produces a magnetic induction $Br$. The outside magnet produces a magnetic induction $Ba$. The total magnetic induction $B_F = Ba \pm Br$. The first magnet comprises oxidic ferromagnetic material.

The galvanomagnetic semiconductor body comprises one of a Hall generator, a galvanomagnetic resistance and a resistance having a magnetic barrier layer. The outside magnet may be either a movable permanent magnet or an electromagnet.

A second magnet is connected in the magnetic circuit in magnetic parallel with the first magnet relative to the semiconductor body. The second magnet has a high coercive force relative to the first magnet and a small initial permeability.

The first magnet comprises a ferrite material and the second magnet comprises one of ferromagnetic oxide material and aluminum-nickel-cobalt material.

The magnetic circuit is structured in a manner whereby the portion of the induction produced by the second magnet which acts upon the first magnet is small relative to the remanent induction produced by the first magnet. The induction produced by the second magnet and acting upon the semiconductor body is at least equal to the induction produced by the first magnet. The magnetic circuit includes magnetic materials having structures and cross-sections structured and dimensioned in a manner whereby the magnetic circuit in the vicinity of the semiconductor body and in the vicinity of the second magnet has a magnetic resistance which is small relative to the magnetic resistance of the magnetic circuit in the vicinity of the first magnet.

In accordance with my invention, a contact-free electrical pulse generator for controlling transistors, thyristors, relays, keyers, pulse generators, and the like, comprises a permanent magnetic circuit. A galvanomagnetic semiconductor body is in the magnetic circuit. The magnetic circuit directs a control magnetic field during operation to the semiconductor body. The galvanomagnetic semiconductor body comprises one of a Hall generator, a galvanomagnetic resistance and a resistance having a magnetic barrier layer. A first magnet in the magnetic circuit comprises a ferrite material having a rectangular hysteresis loop. An outside magnet outside the magnetic circuit provides a magnetic field for abruptly switching the first magnet from one remanent state to the other whereby the total magnetic induction which results in the semiconductor body changes abruptly from one magnitude to another. The outside magnet comprises one of a movable permanent magnet and an electromagnet. A second magnet is connected in the magnetic circuit in magnetic parallel with the first magnet relative to the semiconductor body. The second magnet comprises one of ferromagnetic oxide material and aluminum-nickel-cobalt material and has a high coercive force relative to the first magnet and a small initial permeability. The magnetic circuit includes magnetic materials having structures and cross-sections structured and dimensioned in a manner whereby the magnetic circuit in the vicinity of the semiconductor body and in the vicinity of the second magnet has a magnetic resistance which is small relative to the magnetic resistance of the magnetic circuit in the vicinity of the first magnet. The portion of the induction produced by the second magnet which acts upon the first magnet is small relative to the remanent induction produced by the first magnet. The induction produced by the second magnet and acting upon the semiconductor body is at least equal to the induction produced by the first magnet. The pulse generator of the invention is called contact-free, since contact-breaking electrical switches are not utilized in its operation. The pulse generator or switch of the invention also operates without proximity, since the proximity of a magnet is sufficient, for example, to produce a pulse or a signal, respectively, at the output of the semiconductor body. The first magnet, having a rectangular hysteresis loop, is known as a rectangular magnet and is identified as a switching magnet hereinafter. Such magnets are widely utilized in many applications, included among which are magnetic storers.

The pulse generator generates a pulse during the amplification of the control magnetic field, which is influenced from the outside by the outside magnet, at a specific minimum magnitude of same, only if the induction of said control magnetic field within the switching magnet is aligned in opposition to the remanent induction of the control magnetic field. The pulse generator also includes memory characteristics. The pulse generator of my invention utilizes an additional, second or biasing magnet which provides a magnetic coupling between the two permanent magnets of the magnetic circuit which may be made either very strong or very weak.

In a first instance, the biasing magnet forces the direction of the remanent induction upon the switching magnet for as long as no outside field of sufficient intensity and of opposite direction to the induction of said biasing magnet in the vicinity of the switching magnet acts upon said switching magnet. However, when the outside field attains an adequate intensity, the remanent induction of the switching magnet creates an abrupt reversal in polarity. If the semiconductor body is a Hall voltage generator, for example, which produces a Hall voltage proportional to the effective induction, the resultant Hall voltage signal will change abruptly in accordance with the induction, that is, during the amplification of the outside field as well as during the subsequent induction of said outside field. This may result in a pulse generator or switch which operates without contacts and without proximity.

The second or biasing magnet is primarily intended for shifting the working point of the magnetic circuit into the linear region of the characteristic of the galvanomagnetic resistance. The biasing magnet thus premagnetizes the magnetic circuit. The utilization of the second magnet is worthwhile only when the semiconductor body has a characteristic which is non-linear in a specific area of the effective magnetic induction. Typical representatives of such semiconductor bodies are galvanomagnetic resistances comprising semiconductor material having high carrier mobility, which galvanomagnetic resistances are called field plates. Field plates are described in German Pat. No. 1,238,987.

In order to be able to operate in the linear portion of the characteristic of the galvanomagnetic resistance, it may be preferable to provide the biasing magnet with an induction which is greater than or of the same magnitude as the switching magnet. To prevent the biasing magnet from exerting too great an influence upon the switching magnet, it is preferable to design the magnetic circuit in a manner whereby the magnetic resistance will be slight in the portion of the magnetic circuit which contains the semiconductor body and the biasing magnet, compared to the remaining portion of the magnetic circuit. This may be accomplished by designing the cross-sections of the magnetically conductive portions of the magnetic circuit with suitable dimensions and configurations.

In order that the present invention may be readily carried into effect, it will now be described with reference to the accompanying drawings, wherein.

Figure 5:
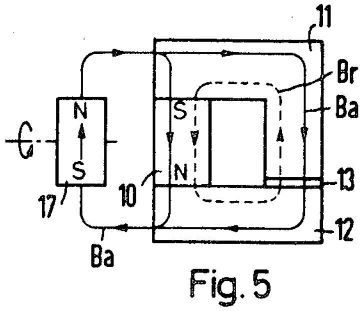
FIG. 5 is a schematic diagram of an embodiment of the electrical pulse generator of the invention.
Figure 8:
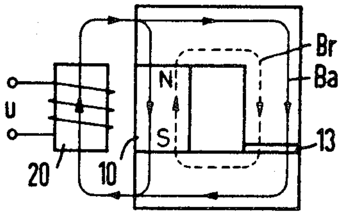
Figure 10:
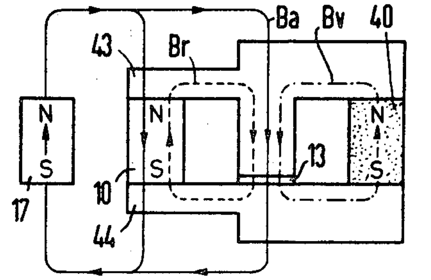
Figure 13:
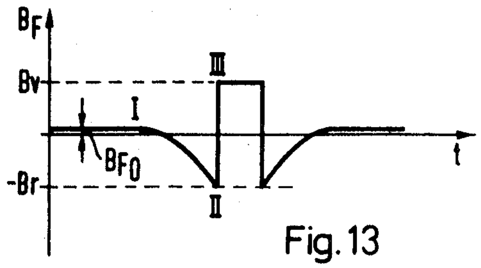

FIGS. *6a*, *6b*, *6c* and *6d* are schematic diagrams illustrating the operation of the electrical pulse generator of FIG. 5;

FIGS. *7a*, *7b* and *7c* are graphical presentations illustrating the operation of the embodiment of FIG. 5;

FIG. 8 is a schematic diagram of a modification of the embodiment of FIG. 5;

FIGS. *9a* and *9b* are graphical presentations illustrating the operation of the modification of FIG. 8;

FIG. 10 is a schematic diagram of another embodiment of the electrical pulse generator of the present invention;

FIGS. *11a* and *11b* are graphical presentations illustrating the operation of the embodiment of FIG. 10;

FIGS. *12a* and *12b* are schematic diagrams illustrating the operation of the embodiment of FIG. 10; and FIG. 13 is a graphical presentation illustrating the operation of the embodiment of FIG. 10.

In the figures, the same components are identified by the same reference numerals.

Figure 1:
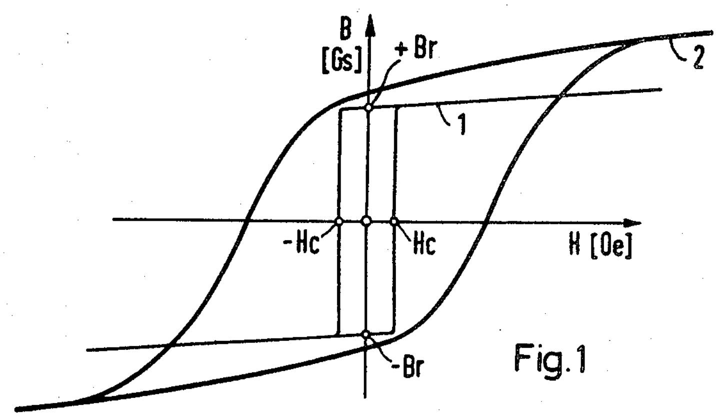
FIG. 1 is a graphical presentation of the field magnetic induction characteristic of the first magnet.

In FIG. 1, the abscissa represents the magnetic field H in Oersteds and the ordinate represents the magnetic induction B in Gauss. The curve 1, having a rectangular hysteresis loop, is provided by a ferrite magnet. Ferrite magnets are produced and sold under the name "Siferrit" or "Magnoflex," for example. The remanent induction B*r* of the ferrite magnet may fluctuate between approximately 2 and 20 kilogauss and the coercive force Hc may fluctuate between approximately 0.01 and 80 Oersteds. The permeability of such magnets lies within the range of saturation, at approximately 1 gauss per Oersted, and is almost infinite in the region of the steep portions of the hysteresis loop. The greater the remanent induction B*r*, the greater, naturally, the abrupt variation from +B*r* to −B*r*, and the greater the signal produced by the semiconductor body within the effective region of the magnet. The signal produced by the semiconductor body is steeper, the closer the hysteresis of ideal rectangular configuration is approached.

In FIG. 1, the curve 2 indicates qualitatively the characteristic of the second or biasing magnet which may be used in the pulse generator of the invention. The coercive force of the second magnet has a flat, but wide, hysteresis which is considerably greater than that of the ferrite magnets. The force may be, for example, between 300 and 3,000 Oersteds. Magnets having the characteristic of curve 2 of FIG. 1 are particularly distinguished by the fact that the product (B)(H) is considerably greater than the product (B)(H) of the ferrite magnets.

Figure 2:
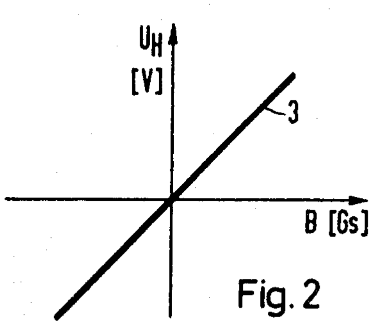
FIG. 2 is a graphical presentation of the magnetic induction-Hall voltage characteristic of a Hall voltage generator.

FIG. 2 is a qualitative illustration of the characteristic of a Hall voltage generator. In FIG. 2, the abscissa represents the magnetic induction B in Gauss and the ordinate represents the Hall voltage $U_H$ in volts. The characteristic of FIG. 2, as shown by curve 3, is essentially linear, since the Hall voltage $U_H$ is proportional to the magnetic induction B.

Figure 3:
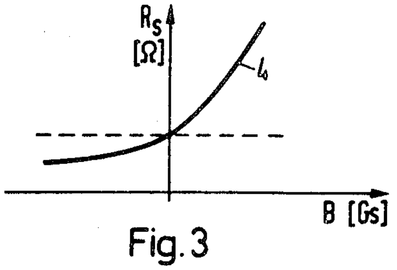
FIG. 3 is a graphical presentation of the magnetic induction-resistance of a galvanomagnetic resistance with a magnetic blocking layer.
Figure 4:
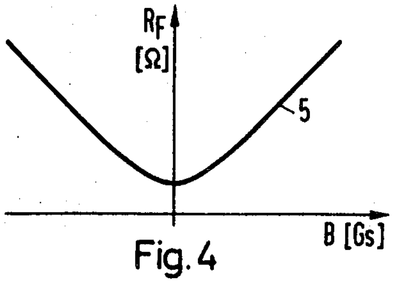
FIG. 4 is a graphical presentation of the magnetic induction-resistance of a galvanomagnetic resistance having high carrier mobility.

FIGS. 3 and 4 are the corresponding characteristics of two galvanomagnetic resistances, the galvanomagnetic resistance of FIG. 3 having a magnetic blocking layer and the galvanomagnetic resistance of FIG. 4 having high carrier mobility. In each of FIGS. 3 and 4, the abscissa represents the magnetic induction B in Gauss. The ordinate of FIG. 3 represents the resistance $R_S$ in ohms and the ordinate of FIG. 4 represents the resistance $R_F$ in ohms. In curves 4 and 5 of FIGS. 3 and 4, respectively, a non-linear correlation exists between the resistance and the induction only at the lower magnetic induction.

The magnetic circuit of FIG. 5 comprises a first or switching magnet 10 having a rectangular hysteresis loop and soft magnetic parts or portions 11 and 12. A galvanomagnetic semiconductor body 13 is positioned in an air gap between the soft magnetic parts 11 and 12 of the magnetic circuit. The induction B*r* of the first magnet 10 acts upon the semiconductor body 13. A movable outside magnet 17 is provided and produces an induction B*a* which also acts upon the semiconductor body 13. The outside magnet 17 may be rotatable, as well as movable. The magnetic field of the outside magnet 17 is intercepted by the semiconductor body 13 and by the switching magnet 10.

When it is desired that the outside magnet 17 have a linear movement rather than a rotary movement, it may be mounted on a suitable linear moving device. The outside magnet 17 may be moved, for example, in the direction of the arrow of FIG. 6*a* toward the switching magnet 10. At the polarities indicated in FIG. 6*a*, and characterized by N and S, the inductions B*r* and B*a* in the vicinity of the switching magnet 10 are initially in opposition and are aligned in the vicinity of the semicondcutor body 13. The lines symbolizing the outside induction B*a* are illustrated in solid lines in FIGS. 6*a* to 6*d* and the lines symbolizing the induction B*r* are shown in broken lines. This indicates that, due to the great distance or separation between the outside magnet 17 and the switching magnet 10, in FIG. 6*a*, a mutual influence may hardly be detected.

Figure 6A:
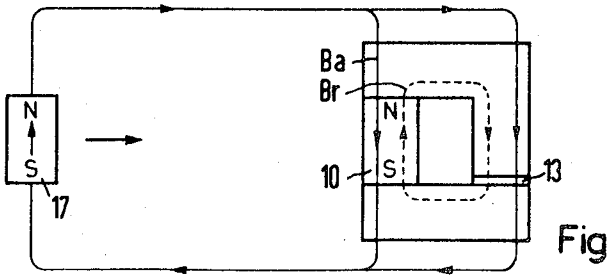
Figure 6B:
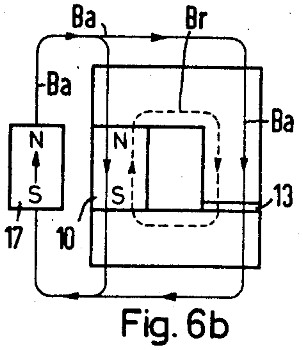
Figure 6C:
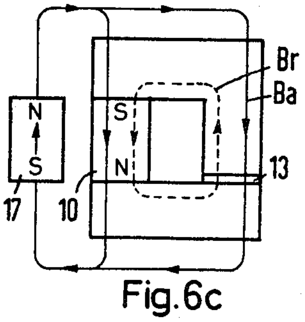
Figure 6D:
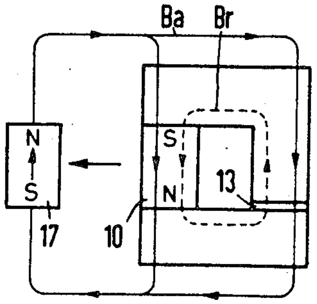

When the magnets 10 and 17 are brought into proximity with each other, as shown in FIG. 6*b*, the induction B*a* of the outside magnet 17 becomes so strong in the magnetic circuit that it exceeds the natural or remanent induction B*r* of the switching magnet 10 thereby switching said switching magnet from one remanent state to the other. The result of the switching of the switching magnet 10 in remanent states is shown in FIG. 6*c*. It manifests itself in a manner whereby the semiconductor body 13, which is initially exposed to a very strong induction B*a* + B*r*, is suddenly subjected to a very slight induction B*a* − B*r*, only. This is due to the inherent, natural or remanent induction B*r* of the magnetic circuit, as shown in FIG. 6*c*, being opposed to the induction B*a* of the outside magnet 17 in he area or region of the semiconductor body 13. When the outside magnet 17 is again moved away from the magnetic circuit, as indicated by the arrow in FIG. 6*d*, the induction B*a* of said outside magnet decreases in the vicinity of the magnetic circuit, as shown in FIG. 6*d*, so that the sum of the magnetic field acting upon the semiconductor body 13 is again increased.

Figure 7A:
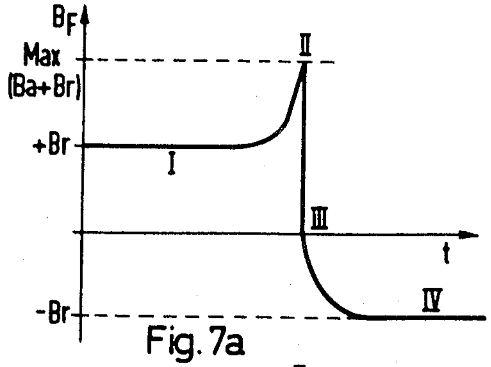
Figure 7B:
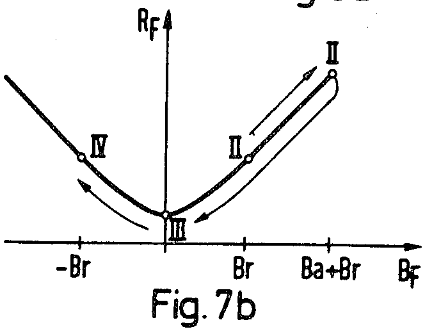
Figure 7C:
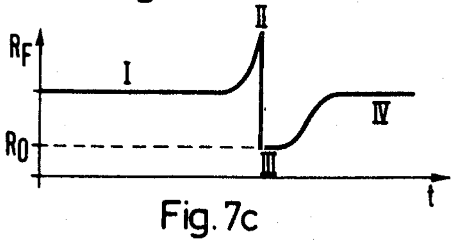

The aforedescribed conditions are described in still greater detail with reference to FIGS. 7*a*, 7*b* and 7*c*. In each of FIGS. 7*a* and 7*c* the abscissa represents time *t*. In FIG. 7*b*, the abscissa represents the magnetic induction B. In FIG. 7*a*, the ordinate represents the magnetic induction B. In each of FIGS. 7*b* and 7*c*, the ordinate represents the resistance $R_f$. The induction indicated by the ordinate of FIG. 7*a* and the induction indicated by the abscissa of FIG. 7*b* is the magnetic induction $B_F$ which is at the area of the semiconductor body 13 of FIG. and FIGS. 6*a* to 6*d*, and equals B*a* ± B*r*. The time *t*, represented by the abscissa of each of FIGS. 7*a* and 7*c*, corresponds to movement of the outside magnet 17, as shown in FIGS. 6*a* to 6*d*.

As long as the outside magnet 17 is still far away from the magnetic circuit of the electrical pulse generator of the invention as illustrated in FIG. 6*a*, only the remanent induction B*r* of the switching magnet 10 will act upon the semiconductor body 13. The magnetic state or condition of the magnetic circuit is indicated as I in FIG. 7*a*. When the outside magnet 17 is moved closer to the switching magnet 10, as shown in FIG. 6*b*, the induction of both magnets overlaps in the vicinity of the semiconductor body 13 until the resultant induction $B_F$, at the point II, drops abruptly to the point III, that is, until said switching magnet suddenly reverses its polarity. In the interest of simplicity, it is assumed in the example of FIGS. 7*a*, 7*b* and 7*c*, that the outside induction B*a* required for switching the switching magnet 10 has the same magnitude as the remanent induction B*r* of said switching magnet.

When the outside magnet 17 is moved away from the vicinity of the magnetic circuit, the resultant induction $B_F$ decreases in the vicinity or area of the semiconductor body 13 and approaches the limit or threshold level −B*r*, indicated by point IV. The resistance value varies in accordance with FIGS. 7*b* and 7*c*, from the point I to gradually increasing resistance values, and then drops back abruptly from the point II to the point III.

Upon the outside magnet 17 being again moved away from the magnetic circuit, as indicated in FIG. 6*d*, the resistance increases again to point IV, since negative magnetic inductions due to the resistance, have characteristics as shown in FIG. 7*b*, as well as positive inductions. In FIG. 7*b*, the point III happens to be positioned on the axis $B_F = 0$, since the outside induction B*a* and the remanent induction B*r*, as shown in FIG. 7*a*, are assumed to be equal. In FIG. 7*c*, the conditions of FIGS. 7*b* and 7*a* correspond with regard to time.

The outside magnet 17 may, of course, be an electromagnet 20, as shown in FIG. 8. If a sinusoidal voltage *u* is applied to the electromagnet 20, and said electromagnet is positioned in the vicinity of the magnetic circuit of the electrical pulse generator of my invention, the outside magnetic field B*a* alternates sinusoidally. If, at the beginning of a period of the alternating magnetic field, the magnetic field B*a* and the remanent magnetic field B*r* are opposed to each other in the switching magnet 10, the rectangular curve B*r*, shown in FIG. 9*a*, indicates the alternation of the remanent induction B*r* in the vicinity of the semiconductor body 13. The outside induction B*a* varies simultaneously in accordance with the curve B*a* of FIG. 9*a*. The inductions B*a* and B*r* are added together in the semiconductor body 13, so that the resultant induction, provided in the vicinity of the semiconductor body 13, is indicated by the curve $B_F$.

Figure 9A:
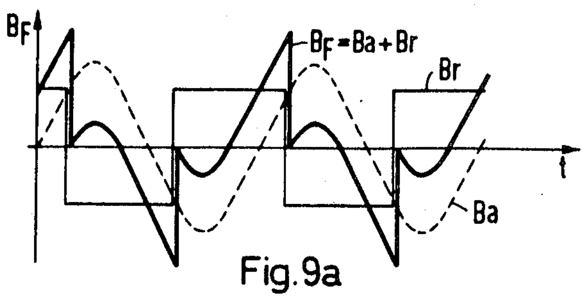
Figure 9B:
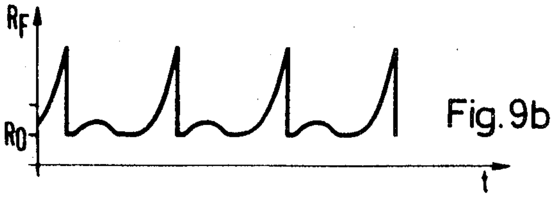

The variation of a resistance having a characteristic as shown in FIG. 4, with respect to time, and subjected to the induction $B_F$ of FIG. 9*a*, is shown in FIG. 9*b*. In FIG. 9*b*, the induction variations occurring in the vicinity of the zero point of FIG. 9*a* are considered to be much lower than the peaks of the induction. This is due to the fact that the resistance $R_F$ for small inductions is approximately proportional to the square of the induction. If, contrary to the assumption relating to FIG. 8, the inductions B*r* and B*a* are initially aligned in the switching magnet 10, the first resistance portion of FIG. 9*b* would be eliminated.

The galvanomagnetic resistance may comprise a Hall generator instead of the semiconductor body 13. The Hall voltage need not be shown by a separate curve, since said Hall voltage varies in proportion with the magnetic induction resulting in the semiconductor body of the Hall generator. A qualitative illustration of the curve of the Hall voltage may be provided by observation of the induction curves relative to time.

If the variation of inductions is to be fully utilized, contrary to FIG. 7*b*, for example, during the utilization of a galvanomagnetic resistance having a characteristic line as shown in FIG. 4, it may be expedient to utilize a magnetic circuit which includes a second or biasing magnet 40, in addition to the first or switching magnet 10. An embodiment of the electrical pulse generator of the invention, including the biasing magnet 40, is shown in FIG. 10. The semiconductor body 13 is then affected by biasing induction B*v*, as well as the remanent induction Br and the induction B*a* of the outside magnetic field.

Figure 11A:
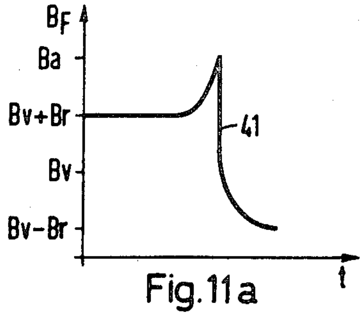
Figure 11B:
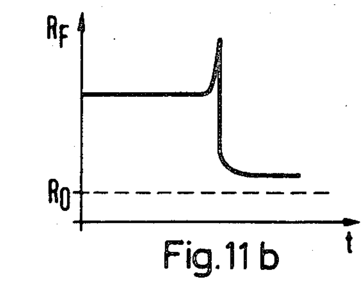

When the outside magnet 17 is in proximity with the magnetic circuit, and has the polaraities shown in FIG. 10, the resultant magnetic induction $B_F$ which acts upon the semiconductor body 13 varies in accordance with the curve 41 of FIG. 11*a*. In FIG. 11*a*, the abscissa represents the time *t* and the ordinate represents the induction $B_F$. The advantage of utilization of the biasing magnet 40 is thus that the resultant induction $B_F$ no longer reverses its polarity in the vicinity of the semiconductor body 13. The entire variation of induction may thus be utilized, in accordance with FIG. 11*b*, for the resistance or resistance drop. In FIG. 11*b*, the abscissa represents the time *t* and the ordinate represents the resistance $R_F$.

It may be of advantage in the aforedescribed type of utilization, to insure that the biasing magnet 40 has as little as possible influence upon the switching magnet 10. In accordance with FIG. 10, this may be achieved by making the magnetically conductive parts, portions or components 43 and 44 between the semiconductor body 13 and the switch 10 as narrow as possible. That is, the magnetic resistances of these components are made as large as possible, compared to the other components, so that the induction Bv of the biasing magnet 40 substantially passes only through the branch of the magnetic circuit which includes the semiconductor body 13, and it is substantially impossible to switch the remanent induction B*r*.

On the other hand, it may also be preferable to provide the induction B*v* of the biasing magnet 40 so strong in the vicinity of the switching magnet 10 that said biasing magnet will always force an induction direction upon said switching magnet, whenever an opposing outside field is absent. As shown in a comparison of FIGS. 12*a* and 12*b*, an outside magnetic field B*a* of adequate intensity and appropriate direction may switch, during the course of its influence, the remanent induction B*r* of the switching magnet 10, in opposition to the effect of the biasing magnet 40.

Figure 12A:
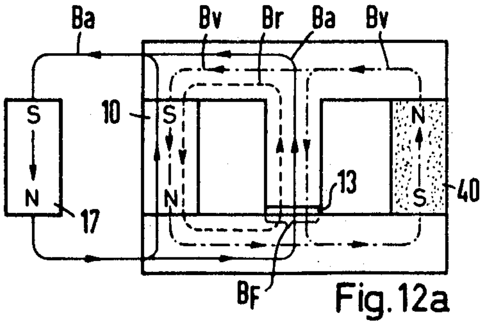
Figure 12B:
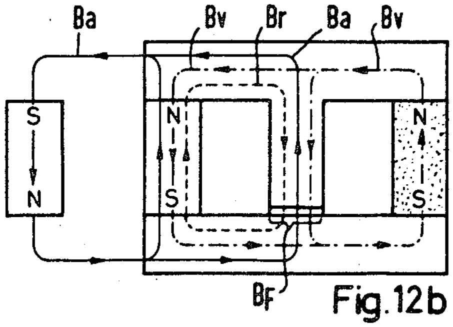

The pertinent induction conditions in the semiconductor body 13 are qualitatively illustrated in FIG. 13. In FIG. 13 the abscissa represents the time *t* and the ordinate represents the induction $B_F$. An outside magnetic field Ba such as, for example, produced by a moving outside magnet 17, as shown in FIGS. 12*a* and 12*b*, influences the magnetic circuit. Initially, the induction $B_{F_0}$ of the area or point I is very small or nearly zero when the outside induction is increasing. The induction $B_F$ increases toward the threshold limit −B*r*. When the threshold limit is exceeded, the switching magnet 10 abruptly reverses its induction. The induction of the switching magnet 10 thus varies abruptly from the point II to the point III.

The induction $B_F$ remains at the point III as long as the induction B*a* of the outside magnet 17 is sufficiently high. When the induction B*a* of the outside magnet 17 again drops in value, the variation is repeated in the opposite direction. When a Hall voltage generator is utilized as the semiconductor body 13, the curve of FIG. 12 simultaneously indicates the Hall voltage versus time.

While the invention has been described by means of specific examples and in specific embodiments, I do not wish to be limited thereto, for obvious modifications will occur to those skilled in the art without departing from the spirit and scope of the invention.

I claim:

1. A contact-free electrical pulse generator comprising
   - a closed magnetic circuit having soft magnetic yoke components;
   - a galvanomagnetic semiconductor resistance in the magnetic yoke of said magnetic circuit;
   - a permanent magnet in said magnetic circuit, defining a part of the magnetic circuit and having a magnetic axis, a low coercive field force and a high remanent induction; and
   - an outside magnet outside said magnetic circuit, the outside magnet having a magnetic axis parallel to the magnetic axis of the permanent magnet, the outside magnet providing a magnetic field having a variable magnitude and direction in accordance with the distance of the outside magnet from the permanent magnet and the polarity of the outside magnet abruptly switching said first magnet from one remanent state to the other whereby the total magnetic induction which results at said semiconductor resistance changes abruptly from one magnitude to another, the magnetic yoke of the magnetic circuit directing a control magnetic field including the field of the outside magnet during operation through the semiconductor resistance.

2. A contact-free electrical pulse generator as claimed in claim 1, wherein the permanent magnet comprises oxidic ferromagnetic material.

3. A contact-free electrical pulse generator as claimed in claim 1, wherein said galvanomagnetic semiconductor resistance comprises a Hall generator.

4. A contact-free electrical pulse generator as claimed in claim 1, wherein said outside magnet is a movable permanent magnet.

5. A contact-free electrical pulse generator as claimed in claim 1, wherein said outside magnet is an electromagnet.

6. A contact-free electrical pulse generator as claimed in claim 1, further comprising a second magnet connected in said magnetic circuit in magnetic parallel with said permanent magnet relative to said semiconductor resistance, said second magnet having a high coercive force relative to said permanent magnet.

7. A contact-free electrical pulse generator as claimed in claim 6, wherein said permanent magnet comprises a ferrite material.

8. A contact-free electrical pulse generator as claimed in claim 6, wherein said second magnet comprises ferromagnetic oxide material.

9. A contact-free electrical pulse generator as claimed in claim 6, wherein said galvanomagnetic semiconductor resistance comprises a Hall generator.

10. A contact-free electrical pulse generator as claimed in claim 6, wherein said outside magnet is a movable permanent magnet.

11. A contact-free electrical pulse generator as claimed in claim 6, wherein the magnetic yoke components of said magnetic circuit comprise a magnetic yoke having the structure of a shielding transformer having three legs, the galvanomagnetic semiconductor resistance being positioned in one of the legs of the yoke, the permanent magnet being positioned in another of the legs of the yoke, and the second magnet being positioned in the third of the legs of the yoke .

12. A contact-free electrical pulse generator as claimed in claim 11, wherein the induction produced by said second magnet and acting upon said semiconductor resistance is at least equal to the induction produced by said permanent magnet.

13. A contact-free electrical pulse generator as claimed in claim 11, wherein the other of the legs of the magnetic yoke in the vicinity of the permanent magnet has a cross-section which is smaller than the cross-section of the one of the legs of the magnetic yoke in the vicinity of said semiconductor resistance and smaller than the cross-section of the third of the legs of the magnetic yoke in the vicinity of said second magnet.

14. A contact-free electrical pulse generator as claimed in claim 1, wherein the galvanomagnetic semiconductor resistance has a magnetic barrier layer.

15. A contact-free electrical pulse generator as claimed in claim 6, wherein the second magnet comprises aluminum-nickel-cobalt material.

16. A contact-free electrical pulse generator as claimed in claim 6, wherein the galvanomagnetic semiconductor resistance has a magnetic barrier layer.

17. A contact-free electrical pulse generator as claimed in claim 6, wherein the outside magnet is an electromagnet.

* * * * *